Figure 1:
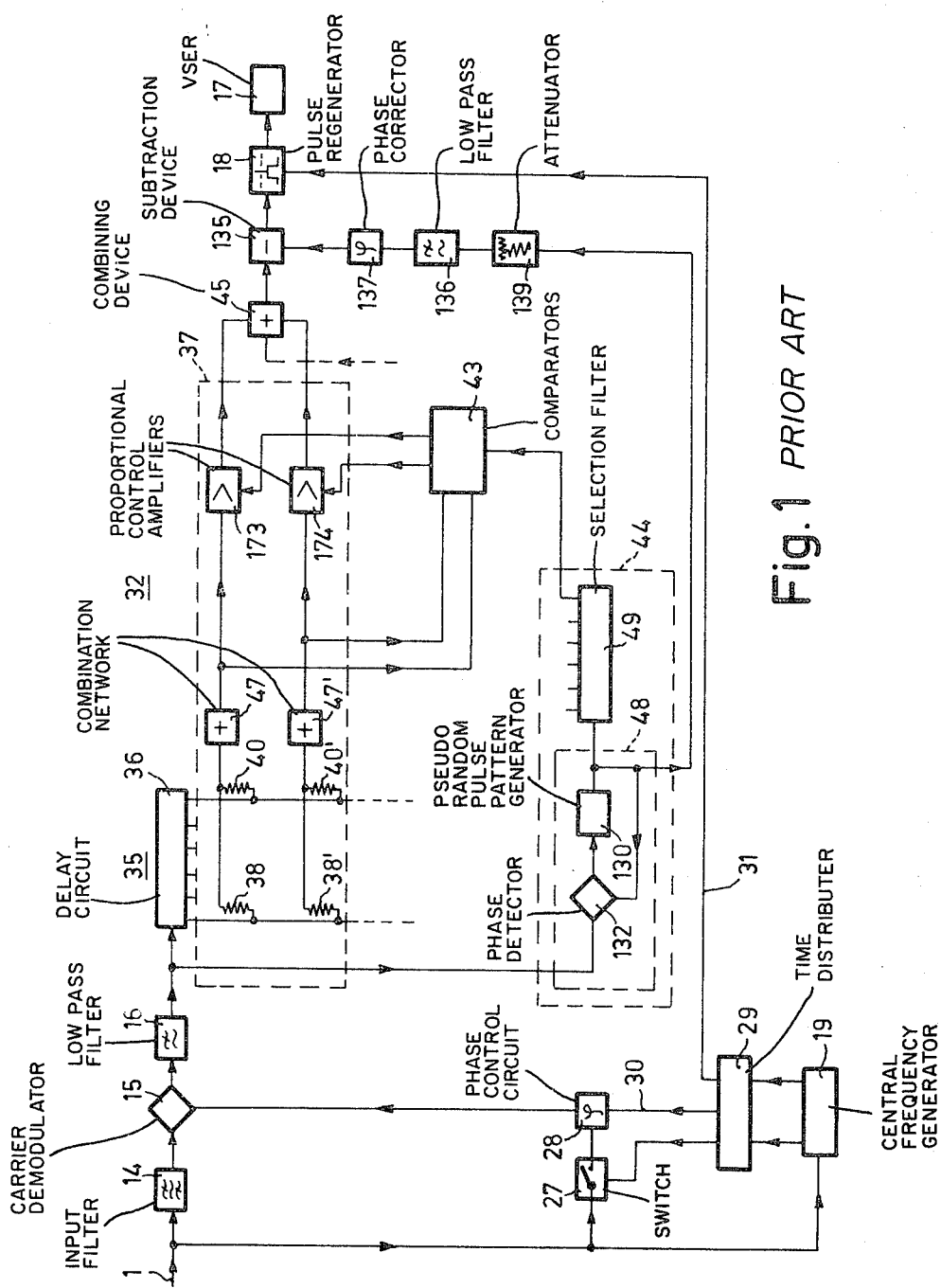

United States Patent [19]

Bagdasarjanz

[11] 3,979,677
[45] Sept. 7, 1976

[54] SYSTEM FOR AUTOMATIC EQUALIZATION

[75] Inventor: Felix Bagdasarjanz, Winterthur, Switzerland

[73] Assignee: U.S. Philips Corporation, New York, N.Y.

[22] Filed: Apr. 3, 1975

[21] Appl. No.: 564,657

[30] Foreign Application Priority Data
Apr. 25, 1974  Netherlands.................... 7405553

[52] U.S. Cl.................................. 325/42; 325/65; 333/18; 333/28 R
[51] Int. Cl.². ........................................ H04B 1/00
[58] Field of Search............. 325/42, 65; 333/17 R, 333/18, 28 R; 324/77 R, 77 E, 77 F, 77 B; 178/69.5 R

[56] References Cited
UNITED STATES PATENTS

| 3,283,063 | 11/1966 | Kawashima et al. .............. 325/65 X |
| 3,366,895 | 1/1968 | Lucky................................... 333/18 |
| 3,845,390 | 10/1974 | DeJager et al...................... 325/42 |
| 3,868,576 | 2/1975 | Bagdasarjanz et al. ............. 325/65 |
| 3,868,603 | 2/1975 | Guidoux ............................. 333/18 |

Primary Examiner—Robert L. Griffin
Assistant Examiner—Robert Hearn
Attorney, Agent, or Firm—Frank R. Trifari; Simon L. Cohen

[57] ABSTRACT

Equalizing system arranged for pulse transmission, adaptive equalization being achieved without the use of an additional periodic adjusting pulse pattern. For this purpose in a control voltage generator the sub-bands and the associated additional sub-bands of an equalized pulse signal processed by the phase and amplitude control circuits are used after pulse regeneration directly as a local reference signal and an adjusting signal respectively. The sub-bands and additional sub-bands are applied to the cascade connection of a comparator and a mean-value device for generating the control voltage which controls the phase and amplitude control circuits in a feedback mode.

11 Claims, 7 Drawing Figures

SYSTEM FOR AUTOMATIC EQUALIZATION

U.S. Pat. No. 3,845,390, relates to a system for equalizing the transfer characteristic of a transmission band associated with a transmission path and allotted to the transmission of information signals, which characteristic is constituted by the amplitude-frequency characteristic and the phase-frequency characteristic, which system is designed for the transmission of information pulses, a combination of the following measures being taken:

a. a frequency analyzer for splitting up the transmission band into a number of frequency sub-bands, comprising a delay circuit and a plurality of parallel arranged output channels, each of the output channels incorporating a sub-band pass filter and an additional sub-band pass filter having the same pass band but a constant mutual phase shift at least over the pass band, which sub-bandpass filters are constituted by connecting each of the output channels through a plurality of weighting networks to points having a difference time delay in the delay circuit, while the frequency-split frequency sub-bands are derived from the parallel arranged output channels;

b. the sub-bandpass filters in the output channels of the frequency analyzer jointly constitute an uninterrupted pass region without reject areas;

c. different output channels of the frequency analyzer incorporate a phase and amplitude control circuit controlled by a control voltage;

d. a control voltage generator for generating the control voltages for controlling the phase and amplitude control circuits incorporated in the output channels of the frequency analyzer, which control voltage generator comprises a plurality of comparators fed by at least one spectrum component of an incoming adjusting signal which is split up into its frequency components in the frequency analyzer, the generator further comprising a local reference source for the phase and amplitude references of the adjusting signal split up into its frequency components, the control voltages for the different phase and amplitude control circuits being derived from the outputs of the comparators;

e. a system output circuit comprising a combination device connected to the phase and amplitude control circuits in the output channels and a succeeding pulse regenerator.

Such systems are used in particular for adaptive equalization, the adjustment of the automatic equalizing device being effected simultaneously with the transmission of the information signals, in contradistinction to preset equalization in which the automatic equalizing device is adjusted prior to the transmission of the information signals.

The aforementioned U.S. Pat. describes such a system for adaptive equalization in which together with the information pulses a different pulse pattern of pulses which occur in irregular alternation in the form of a pseudo-random pulse pattern is co-transmitted as an adjusting signal in a periodic rhythm. At the receiver end the co-transmitted pseudo-random pulse pattern is used to synchronize a local pseudo-random pulse pattern generator which is used as a phase reference of the incoming adjusting signal and also to separate the co-transmitted pseudorandom pattern from the information pulses.

It is an object of the present invention to provide another design of an equalizing system of the kind described in the preamble for adaptive equalization without simultaneous transmission of a periodic adjusting pulse pattern, in which system the influence exerted on the equalization by tolerances, temperature variations, aging phenomena and the like is further reduced.

The system according to the invention is characterized in that in the control voltage generator the local reference source is constituted by the pulse regenerator which by pulse regeneration of the information pulses provides the local reference signal, and in that the associated adjusting signal is formed by the information signal which is derived from the outputs of the phase and amplitude control circuits, bypassing the pulse regenerator. For generating the control voltages for the phase and amplitude control circuits the different comparators in the control voltage generator have applied to them a frequency sub-band and an associated additional frequency sub-band of the adjusting signal through a device including a delay circuit and also a same frequency sub-band and an associated additional frequency sub-band of the local reference signal through a device also including a delay circuit having the same time delay. This latter device is arranged as a frequency analyzer having frequency sub-bandpass filters and associated additional frequency sub-bandpass filters by connecting a plurality of weighting networks to points having a different time delay in a delay circuit, while further the output circuits of the comparators each are connected to mean-value devices for feedback control of the phase and amplitude control circuits in the equalizing system.

Figure 3:
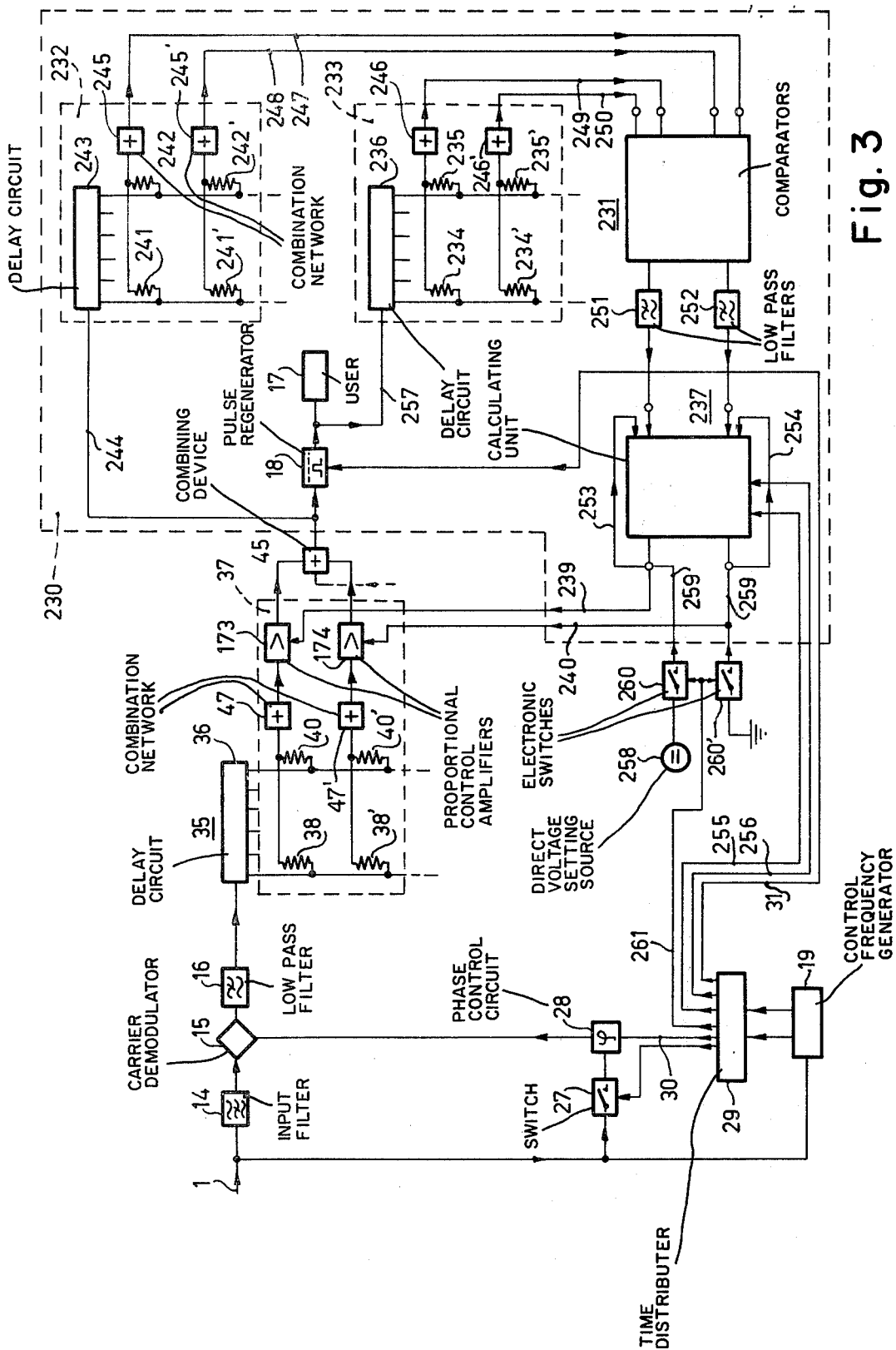
Figure 4:
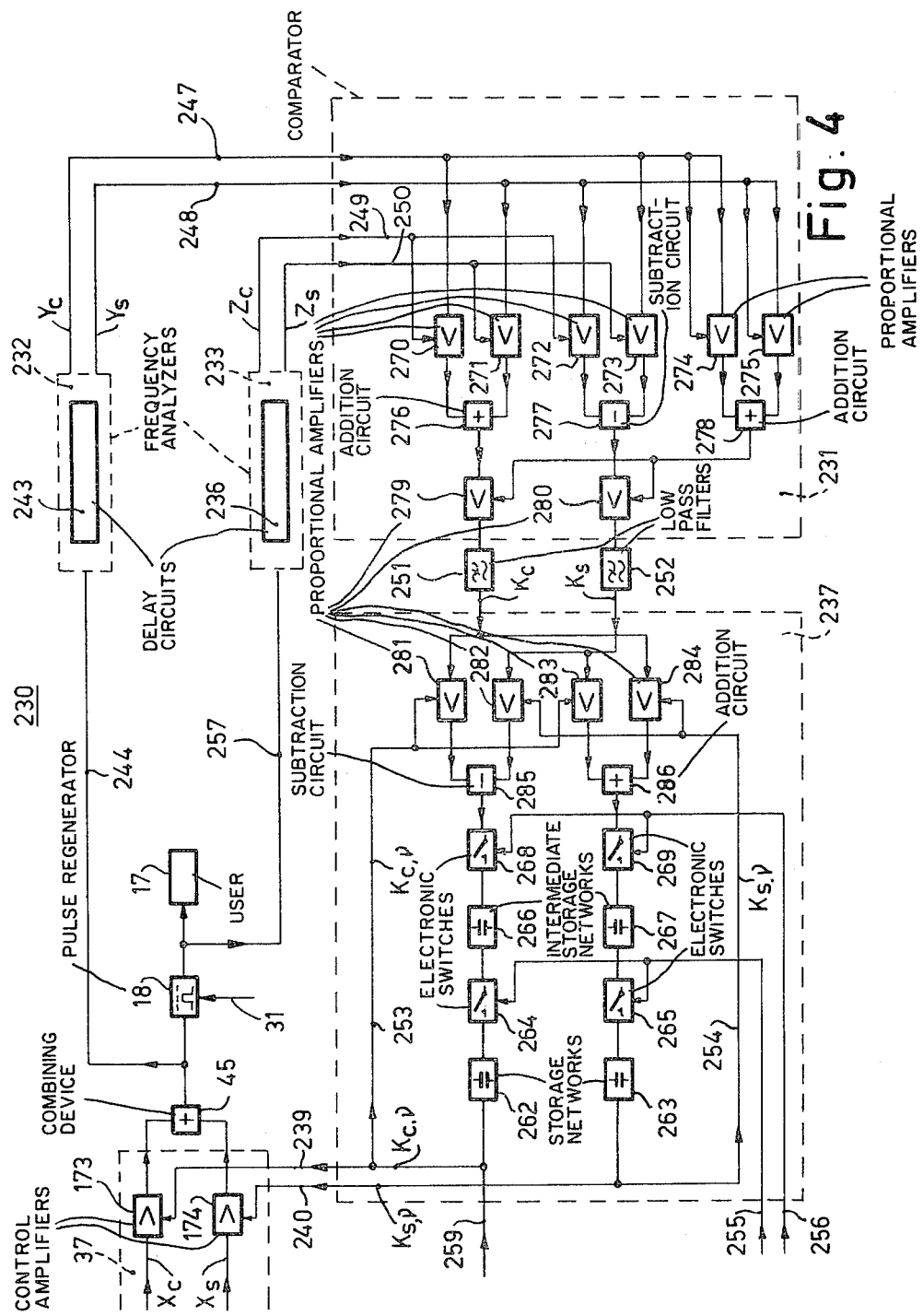
Figure 5:
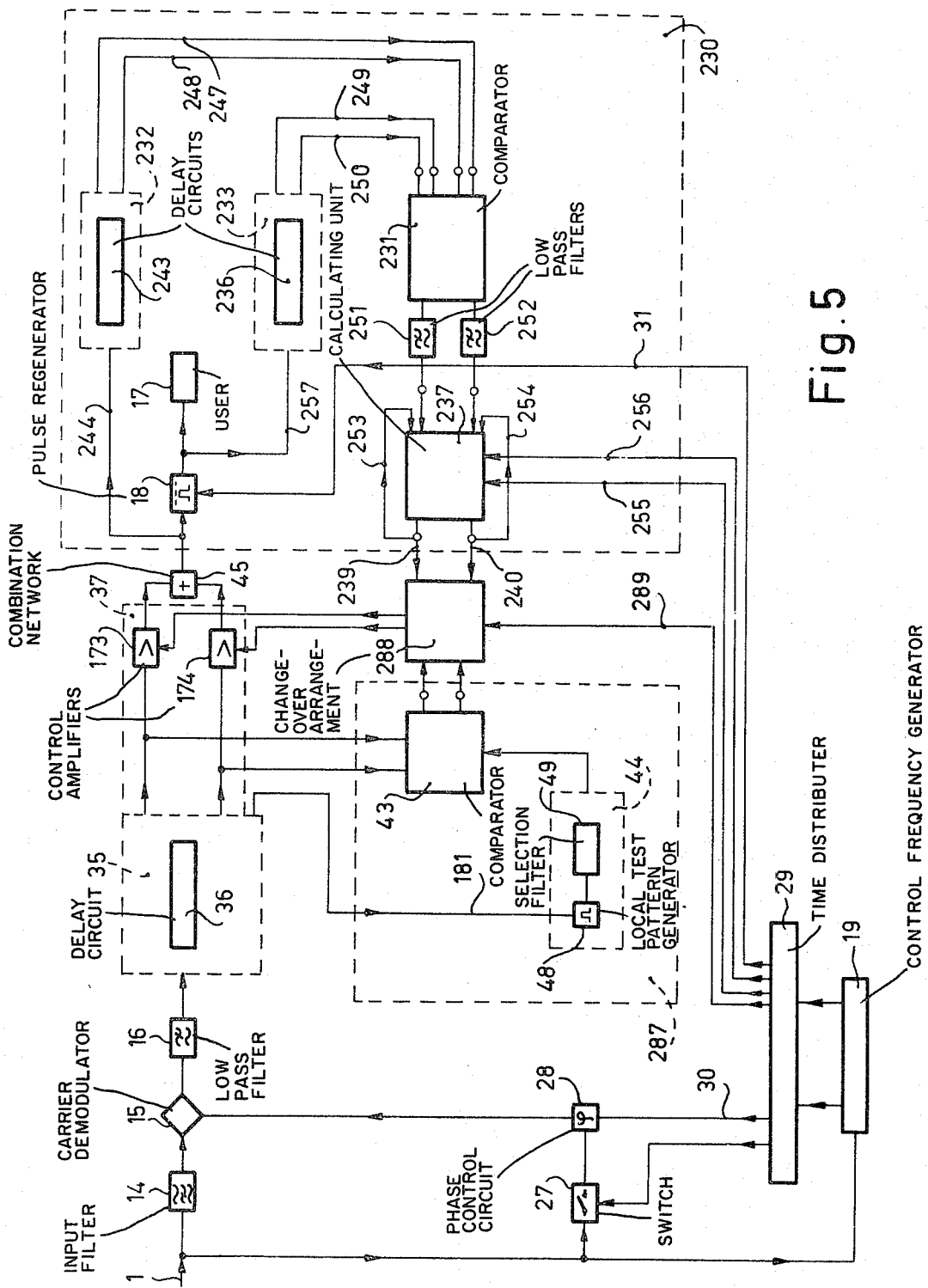

The invention and its advantages will now be described more fully with reference to the accompanying drawings, in which:

FIG. 1 is a block-schematic diagram of an equalizing system of the adaptive type as described in U.S. Pat. No. 3,845,390, and FIGS. 2a–2c show frequency-diagrams illustrating the system of FIG. 1, FIG. 3 is a block-schematic diagram of an equalizing system according to the invention, FIG. 4 shows in more detail a control voltage generator for use in an equalizing system according to the invention, and FIG. 5 shows a modified embodiment of the equalizing system of FIG. 3.

The receiver shown in FIG. 1 is provided with an adaptive equalization system according to U.S. Pat. No. 3,845,390 and is arranged for receiving synchronous binary pulse signals at a transmission rate of 3.2 kbit/sec which are transmitted by means of single-sideband modulation having a partially suppressed carrier of 2.6 kHz in a transmission channel between 0.3 and 3.4 kHz. The system of FIG. 1 corresponds to FIGS. 2 and 26 of this U.S. Patent, identical numbers being used to identify corresponding components. On either side of the transmission band occupied by the modulated pulse signals a pilot signal at 0.6 kHz and 3 kHz, respectively, is co-transmitted for the local recovery of the carrier and the clock frequency at the receiver end.

As has been set forth in the U.S. Patent the signals transmitted in this manner are applied through a lead 1 to the receiver which comprises an input filter 14, a carrier demodulator 15 controlled by a local carrier and associated output filter 16 in the form of a lowpass filter, the demodulated pulse signals being applied for further processing by a user 17 through a pulse regenerator 18 including a sampler controlled by locally generated clock pulses. For generating the local carrier and the local clock pulses the receiver includes a central frequency generator 19 which is controlled by the two pilot signals, the clock frequency of 3.2 kHz and the carrier frequency of 2.6 kHz being obtained in the manner described in the U.S. Patent.

As is stated in the U.S. Patent, the receiver is provided with a time distributor 29 connected to the output of the central frequency generator 19 which in this embodiment is rendered operative on reception on the two pilot signals, for example at the occurrence of the difference frequency of 2.4 kHz, while for the reception of the modulated pulses signals from the transmitter the local carrier and the local clock pulses are consecutively applied to the carrier demodulator and to the pulse regenerator 18 including the sampler through a carrier lead 30 and a clock frequency lead 31, respectively. The carrier lead 30 is provided in known manner with a phase control circuit 28 for correcting the phase of the locally generated carrier in accordance with the phase of the carrier which is transmitted at the commencement of transmission and which is applied for a short period of time through a switch 27 to the phase control circuit 28 whose phase is maintained after switch 27 is opened. Thus, on reception of the modulated pulse signals the local carrier and the clock pulses are already present at the carrier demodulator 15 and the pulse regenerator 18, respectively.

To obtain optimum resolution of the binary pulses consisting of "1" and "0" pulses in the pulse regenerator 18, an automatic equalizing system 32 is arranged between the lowpass filter 16 and the pulse regenerator 18. According to the U.S. Patent this system 32 comprises a frequency analyzer 35 for splitting up the transmission band into a plurality of frequency sub-bands, said analyzer comprising a delay circuit 36 and a plurality of parallel arranged output channels 37 of equal structure which incorporate sub-bandpass filters which in the output channels 37 jointly constitute an uninterrupted pass region without reject-areas for the frequency components of the information signal. The output channels 37 incorporate, in addition to the sub-bandpass filters, additional sub-bandpass filters. The two sub-bandpass filters in an output channel 37 are constituted by connecting weighting networks in the form of attenuating networks 38–40 and 38'–40' each at one end to points having a different time delay in delay circuit 36, for example at time intervals of a clock period T, and at the other end to combination networks 47 and 47' respectively. The frequency-split sub-bands are derived from the combination networks 47 and 47' in the parallel arranged output channels 37. In the various output channels 37 the sub-band-pass filters 38 – 40, 47 and the additional sub-band-pass filters 38' – 40', 47' have the same pass band but, at least over the pass band, a constant relative phase shift, in particular equal amplitude-frequency characteristics but phase-frequency characteristics which are mutually shifted in phase by $\pi/2$ and, similarly to the U.S. Patent, advantageously show a linear variation and moreover frequency proportionality for the phase-frequency characteristic of the sub-bandpass filters 38 – 40, 47 in that, as is stated in the U.S. Patent, the weighting factors of the weighting networks 38 – 40 and 38' – 40' are proportioned according to the coefficients of a Fourier series having cosine terms only and having sine terms only, respectively.

For automatic equalization each output channel 37 of the frequency analyzer 35 incorporates a phase and amplitude control circuit, combination of the outputs of all the output channels 37 in a combining device 45 producing the equalized output signal of the equalizing system, which signal is applied to the pulse regenerator 18 for further processing by a user 17. In the embodiment shown the phase and amplitude control circuits in the output channels 37 take the form of proportional control amplifiers 173 and 174, respectively, i.e. their amplification factors are proportional to the control voltages.

To generate the control voltages for controlling the proportional control amplifiers 173 and 174 in the output channels 37 of the frequency analyzer 35, the system for automatic equalization includes a control voltage generator comprising a plurality of comparators 43 fed by at least one spectrum component of an incoming adjusting signal which is split up into its frequency components in the frequency analyzer 35 and by a local reference source 44 for the phase and amplitude references of the adjusting signal split up into its frequency components, the control voltages for the control amplifiers 173 and 174 being derived from the outputs of the comparators 43. The reference source 44 comprises a local test pulse pattern generator 48, which corresponds to an equal test pulse pattern generator at the transmitter end, and a selection filter 49 for selecting the various frequency components of the local test pulse pattern and, if required, a lowpass filter having a Nyquist characteristic which may be connected between the local test pulse pattern generator 48 and the selection filter 49, while the local test pulse pattern generator 48 and the test pulse pattern generator at the transmitter end are synchronized with one another in a manner to be described hereinafter.

Figure 2:
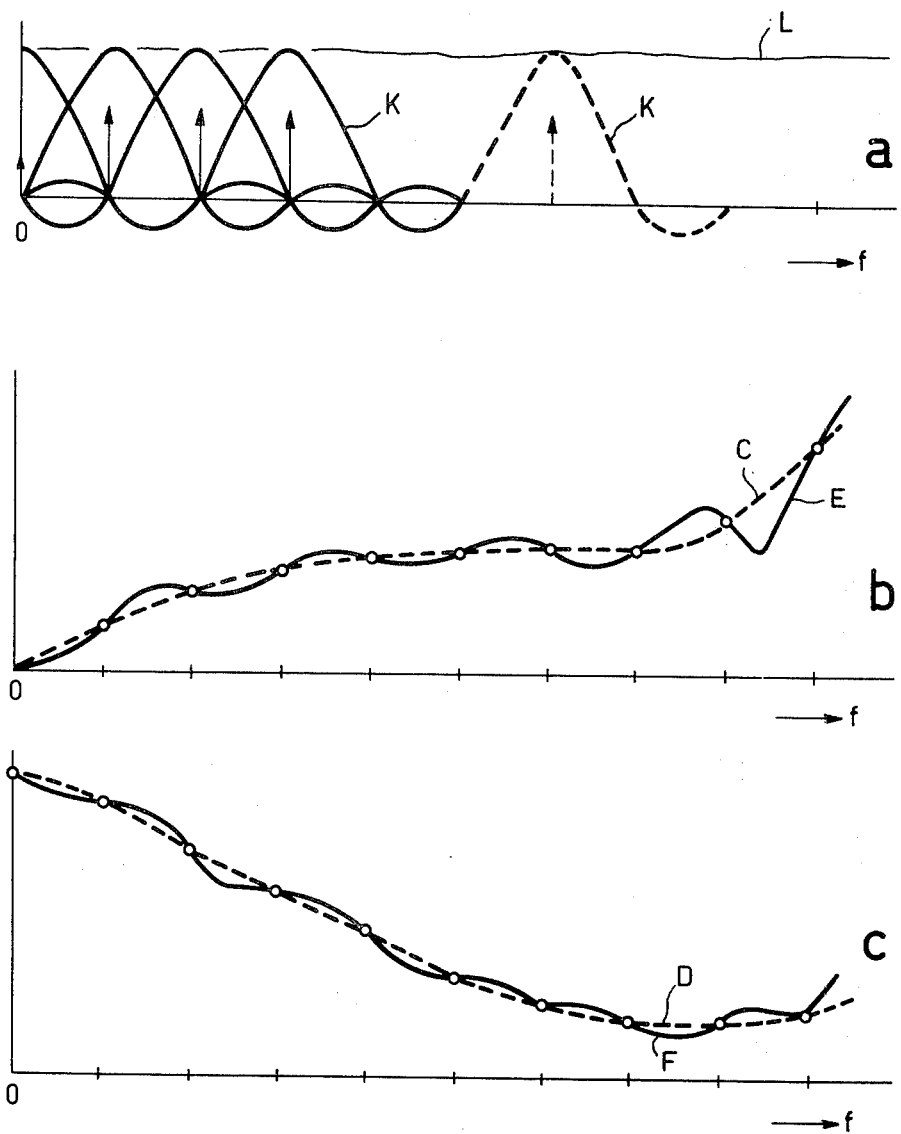

To illustrate the operation of the system described, FIG. 2 shows in a frequency diagram $a$ the amplitude-frequency characteristics of the sub-bandpass filters illustrated by curves K having passbands of, for example, 0 to 100 Hz, 100 to 300 Hz, 300 to 500 Hz, . . ., for selecting the frequency components of the adjusting signal of 0 Hz, 200 Hz, 400 Hz, . . . , respectively. For maximum economy of elements the sub-bandpass filters are of the kind $\sin p(\omega - \omega_m)/p(\omega - \omega_m)$, where $p$ is a constant factor and $\omega_m$ is the angular frequency of the frequency component to be selected in the line spectrum of the adjusting signal, which in this diagram is indicated by arrows. In this diagram the ininterrupted pass region of all the sub-bandpass filters 38 – 40, 47 jointly is also shown by a substantially frequency-independent curve L, the said sub-bandpass filters 38 – 40, 47 jointly showing, as do the separate sub-bandpass filters 38 – 40, 47, a variation of the phase-frequency characteristic which is proportional to the frequency, i.e. the sub-bandpass filters 38 – 40, 47 jointly transmit an input signal situated in the pass region substantially faithfully without distortions.

Thus, the fixed frequency components of 0 Hz, 200 Hz, 400 Hz, . . . of the line spectrum of the adjusting signal are derived from the combination devices 47 and 47' of the sub-bandpass filters 38 – 40, 47 and 38' – 40', 47' respectively, which components are applied to the comparators 43 connected to the reference source 44, the control voltage generated in the comparators 43 being applied for automatic equalization to the phase and amplitude control circuits 173 and 174, respectively. The phase and amplitude control circuits 173 and 174 in all the output channels 37 of the frequency analyser 35 are set simultaneously to the correct amplitude values, and after combination in the combining device the equalized output signal is obtained which is supplied through the pulse regenerator 18 to the user 17 for further processing.

Thus, in the equalization characteristic of the equalization system described exact equalization as to phase and amplitude is obtained for the fixed frequency components of the line spectrum of the adjusting signal, however; it is found that an accurate equalization of the continuous spectrum of the information pulses is also obtained, and the phase equalization characteristic and the amplitude equalization characteristic thereof are illustrated in frequency diagrams b and e of FIG. 2 by solid curves E and F, respectively. For comparison, in these diagrams broken-line curves C and D show the ideal phase equalizing characteristic and amplitude equalizing characteristic, respectively of the said transmission path, small circles indicating the adjusting points at the frequency components of the adjusting signal of 0 Hz, 200 Hz, 400 Hz. In the receiver provided with the adaptive equalizer 32 shown in FIG. 1, in order to ensure adjustment of the equalizer 32 simultaneously with the information pulse transmission, in the system according to the U.S. Patent a periodic pulse pattern of the pseudo-random type comprising pulses which occur in irregular alternation, is transmitted as an adjusting signal together with the information pulses. In the receiver this periodic pseudo-random pulse pattern is used to synchronize a pseudo-random pulse pattern generator 130 which is equal to that at the transmitter end and for this purpose is incorporated in a local test pulse pattern generator 48 arranged as a phase-locked loop. This loop also includes a phase detector 132 and has the demodulated signal derived from the output of the lowpass filter 16 applied to it as a synchronizing signal. As described in the U.S. Patent, this provides accurate synchronization of the pseudo-random pulse pattern generator 130 without the information pulses exerting an appreciable influence.

The resulting local pseudo-random pulse pattern is used via the selection filter 49 in the comparators 43 for generating the control voltages for the control amplifiers 173 and 174 in the output channels 37 of the frequency analyser and also for largely suppressing the pseudo-random pulse pattern which together with the information pulses appears at the output of the combining device 45. This is achieved by applying to a subtraction device 135 connected to the combining device 45, the output signal from the pseudo-random pulse pattern generator 130 via the cascade arrangement of a suitable attenuator 139, a lowpass filter 136 and a phase corrector 137.

According to the invention adaptive equalizing control is obtained by means of the system shown in FIG. 3 without the use of a simultaneously transmitted periodic adjusting pulse pattern. In FIG. 3 elements corresponding to those of FIG. 1 are designated by like reference numerals.

As FIG. 3 shows, this is achieved in that in a control voltage generator 230 the local reference source is constituted by the pulse regenerator 18 which by pulse regeneration of the information pulses provides the local reference signal, the associated adjusting signal being formed by the information signal derived from the outputs of the phase and amplitude control circuits 173 and 174, bypassing the pulse regenerator 18, while for generating the control voltages for the phase and amplitude control circuits 173 and 174 comparators 231 in the control voltage generator 230 have applied to them a frequency sub-band and an associated additional frequency sub-band of the adjusting signal through a device 232 including a delay circuit and also an equal frequency sub-band and an associated additional frequency sub-band of the local reference signal through a device 233 which includes a delay circuit having the same time delay, which device 233 is arranged as a frequency analyzer having frequency sub-bandpass filters and associated additional frequency sub-bandpass filters by a plurality of weighting networks 234 . . . 235 and 234' . . . 235', respectively, being connected to points having a different time delay in a delay circuit 236 and furthermore the output circuits of the comparators 231 are connected to mean-value devices for feedback control of the phase and amplitude control circuits 173 and 174 through control leads 239, 240 respectively. In the embodiment shown the mean-value devices are constituted by the cascade connection of lowpass filters 251, 252 and an calculating unit 237.

The device 232 for the adjusting signal, which includes a delay circuit, preferably also is arranged as a frequency analyzer having frequency sub-bandpass filters and associated additional sub-bandpass filters by a plurality of weighting networks 241 . . . 242 and 241' . . . 242', respectively, being connected to points having a different time delay in a delay circuit 243, the frequency analyzer 232 being connected by a lead 244 to the combining device 45 at a point preceding the pulse regenerator 18 in the output circuit of the output channels 37. The two frequency analyzers 232 and 233 for the adjusting signal and the local reference signal respectively preferably have the same structure as the frequency analyzer 35 described hereinbefore, and in particular the sub-bandpass filters and the additional sub-bandpass filters have the same amplitude-frequency characteristics and phase-frequency characteristics shifted $\pi/2$ in phase, while from combination devices 245, 245' and 246, 246' the frequency sub-bands and additional frequencies sub-bands of the adjusting signal and the local reference signal respectively are derived. For further processing these sub-bands are applied through leads 247, 248 and 249, 250 respectively to the comparators 231 to which the mean-value devices are connected which comprise the lowpass filters 251, 252 and the calculating unit 237. In the embodiment shown the calculating unit 237 of the mean-value devices is provided with feedback leads 253 and 254 and with storage and intermediate storage networks which are controlled via control leads 255, 256 connected to the time distributor 29 in accordance with a repetition period lying between about 20 and 100 clock periods. The control voltage leads 239, 240 for the phase and amplitude control circuits 173 and 174, respectively, are connected to the output circuits of the mean-value devices 251, 252, 237. The comparators 231 and the calculating unit 237 of the mean-value devices will be described more fully hereinafter with reference to FIG. 4.

At the beginning of pulse transmission the equalizing system is set to a neutral condition, i.e. to a condition such that the demodulated pulses at the output of the demodulator 15 reach the frequency analyzer 232 via the combining devices 45 and the lead 244 without being appreciably affected by the equalizing system and also reach the frequency analyzer 233 via a lead 237 after pulse regeneration in the pulse regenerator 18. In the frequency analyzers 232 and 233 the same sub-bands and additional sub-bands are produced from the non-regenerated and the regenerated pulse signals by frequency splitting and are supplied for generating the control voltages for the phase and amplitude control circuits in the form of the proportional control amplifiers 173 and 174 through leads 247, 248 and 249, 250, respectively, to the cascade connection of the comparators 231 and the mean-value device 251, 252, 237.

For setting the equalizing device to the neutral condition the phase and amplitude control circuits 173 and 174 must be adjusted to suitable adjusting values, and in the embodiment shown this is simply effected in that, in the manner described hereinbefore with reference to diagram $a$ of FIG. 2, the joint pass region of all the sub-bandpass filters 38–40, 47 of the frequency analyzer 35 is given a frequency-in-dependent form L, the phase-frequency characteristic varying proportionally with the frequency, for in this case only one common adjusting source 258 of suitable value is required for the various proportional control amplifiers 173 connected to the sub-bandpass filters 38 – 40, 47, which source is connected to the output of the mean-value device 251, 252, 237 by an adjusting lead 259, while for adjusting the proportional control amplifiers 174 connected to the additional sub-bandpass filters 38' – 40', 47' to zero gain only one fixed adjusting value is required, such as for example ground potential, which is applied through an adjusting lead 259' to the output of the mean-value device 251, 252, 237.

When after a time period of, say, from 20 to 100 clock periods control voltage have been built up in the control voltage generator 230, the presetting of the control amplifiers 173, 174 is rendered inoperative by means of electronic switches 260, 260' which are included in the adjusting lead 259, 259' and are controlled by switching pulses from a lead 261 connected to the time distributor 29. Subsequently equalization as to phase and amplitude is effected by feedback by adjustment of the proportional control amplifiers 173 and 174 via the loop: frequency analyzers 232, 233, comparators 231, mean-value devices 251, 252, 237 and control leads 239, 240 for the proportional control amplifiers 173, 174 respectively.

While in the system according to the aforementioned U.S. Patent adjustment of the equalization system is performed by means of the fixed frequency components of the line spectrum of the periodic adjusting pulse pattern, which components, as the filter characteristics of diagram $a$ in FIG. 2 show, owing to their fixed frequency positions are separately obtained in the sub-bandpass filters 38 – 40, 47 and 38' – 40', 47' respectively without being affected by the form of the filter characteristics and by crosstalk phenomena from adjacent sub-bandpass filters. Adjustment of the equalizing system of FIG. 3 is accomplished by means of the frequency components of the substantially continuous frequency spectrum of the information pulses, which frequency components vary greatly in accordance with the information contents and hence are greatly influenced by the form of the filter characteristics and by crosstalk phenomena from adjacent sub-bandpass filters. However, care has been taken to ensure that via the leads 247, 248 and 249, 250 respectively continuously and simultaneously the same frequency components of the adjusting signal and the local reference signal supplied by the summing device 45 and the pulse regenerator 18, respectively, are applied to the comparators 231 by making the delay times of the local frequency analyzers 232 and 233 equal to one another.

In spite of the frequency dependence described of the phenomena it was found that the control voltages generated in the comparators 231 and the mean-value devices 251, 252, 237 surprisingly are largely independent of the information contents of the information pulses, exhibit no disturbing mean-value offset and are characteristic of the amplitude-frequency characteristic and of the phase-frequency characteristic of the transmission path so that these control voltages in the system according to the invention provide excellent equalization as to phase and amplitude by controlling the phase and amplitude control circuits 173 and 174 through control leads 239 and 240 respectively. In particular, extensive investigation has shown that among all the other possible structures the adaptive equalizing system described of the control loop type using no periodic adjusting pulse pattern satisfies the conditions for automatic equalization, complying with the stability conditions and simultaneously with the convergence conditions, so that the system described, starting from a comparatively large equalization error, will invariably adjust automatically to optimal equalization as to phase and amplitude.

Thus a particularly advantageous equalizing system is obtained without the use of a periodic adjusting pulse pattern, while owing to the feedback control process the influence exerted on the equalization by tolerances, temperature variations, aging phenomena and the like are largely reduced. A particularly advantageous feature with regard to quiet control and increase of the equalization control range is the abovedescribed step of splitting up into frequency sub-bands and additional frequency sub-bands which is performed in the frequency analyzer 232 after the combination of all the output channels 37 in the combining device 45.

FIG. 4 illustrates in more detail the control voltage generator 230 used in the system of FIG. 3, and the structure and operation of this generator will be described with reference to a mathematical analysis. Elements corresponding to those of FIG. 3 are designated by like reference numerals.

The following discussion starts from the frequency spectrum of a pulse pattern $x(t)$ which is applied to the input of the frequency analyzer 35 (cf. FIG. 3) during a given time period and which in the output channel 37 of the frequency analyzer 35 is developed by means of a Fourier series into a frequency spectrum having cosine terms and a frequency spectrum having sine terms shifted 90° in phase; if for example the frequency spectrum in the output channel shown is denoted by X and by means of indices $c$ and $s$ the associated cosine and sine frequency spectra are denoted by $X_c$ and $X_s$, we have in complex notation: $X = X_c + jX_s$.

As was explained with reference to FIG. 3, equalization as to phase and amplitude is achieved in the control amplifiers 173 and 174 by controlling the frequency spectrum $X_c + jX_s$ in the control amplifiers 173 and 174 with the aid of the control voltages on the control voltage leads 239 and 240, respectively, which vary in accordance with a mean-value period and for a given mean-value time interval $\nu$ can together be represented in complex notation by $K_{c,\nu} - jK_{s,\nu}$. After combination of all the output channels 37 in the combining device 45 and subsequent pulse regeneration in the pulse regenerated pulse pattern z(t) respectively are obtained which for further processing in the cascade connection of the comparator 231 and the mean-value device 251, 252, 237 are split up in the frequency analyzers 232 and 233 into the cosine and sine frequency spectra $Y_c$, $Y_s$ and $Z_c$, $Z_s$ respectively.

In the system shown the comparator 231 generates from the ratio between the frequency spectrum $Z_c + jZ_s$ of the regenerated pulse pattern z(t) which serves as a reference and the frequency spectrum $Y_c + jY_s$ of the equalized pulse pattern y(t) the complex output signal $K_c - jK_s$ which is applied to the lowpass filters 251, 252 for building up the control voltage $K_{c,\nu} - jK_{s,\nu}$ which appears at the output of the mean-value device and in accordance with the above, by control of the incoming frequency spectrum $X_c + jX_s$ in the proportional control amplifiers 173 and 174, respectively provides the frequency spectrum $Y_c + jY_s$ which is equalized as to phase and amplitude. The complex control voltage $K_{c,\nu} - jK_{s,\nu}$ is derived at the output of the mean-value device 251, 252, 237 from storage networks 262, 263 to which in accordance with the mean-value period the next control voltage value is applied through electronic switches 264, 265, respectively, which next value is supplied by intermediate storage networks 266, 267 preceded by electronic switches 268, 269, respectively, the electronic switches 264, 265 and 268, 269 being controlled by switching pulses applied through leads 255 and 256, respectively, by the time distributor 29.

Thus for the system described we have the following relations in mathematical form:

$$(Z_c + jZ_s)/(Y_c + jY_s) = K_c - jK_s \quad (I)$$

$$(X_c + jX_s)(K_{c,\nu} - jK_{s,\nu}) = Y_c + jY_s \quad (II)$$

which entirely define the functions and the structures of the comparator 231 and the mean-value device 251, 252, 237. The devices 231, 237 will now each be described in detail.

The comparator 231 is determined by the relation (I) and after elaboration we find for the components $K_c$ and $K_s$ in the complex output signal $K_c - jK_s$:

$$K_c - jK_s:$$

$$\left. \begin{array}{l} K_c = (Y_c Z_c + Y_s Z_s)/(Y_c^2 + Y_s^2) \\ \\ K_s = (Y_s Z_c - Y_c Z_s)/(Y_c^2 + Y_s^2) \end{array} \right\} \quad (III)$$

The two components $K_c$, $K_s$ can be derived in a clear manner by means of the comparator 231 shown in detail in this Figure from the input signals $Y_c$, $Y_s$ and $Z_c$, $Z_s$ applied to it through leads 247, 248 and 249, 250 respectively.

For this purpose the comparator 231 is provided with multipliers 270, 271, 272, 273, 274, 275 in the form of proportional amplifiers which are fed with the said input signals and, when connected to the leads 247, 248 and 249, 250 in the manner shown, deliver products $Y_c Z_c$, $AY_s Z_s$, $Y_s Z_c$, $Y_c Z_s$, $Y_c^2$, $Y_s^2$ respectively, while combining devices in the form of an addition circuit 276, a subtraction circuit 277 and an addition circuit 278 are connected to the outputs of the multipliers 270, 271; 272, 273; 274, 275, respectively. The quantities $Y_c Z_c + Y_s Z_s$ and $Y_s Z_c - Y_c Z_s$ produced in the combining devices 276 and 277, respectively, are divided by the output signal $Y_c^2 + Y_s^2$ from the combining device 278 in dividers 279 and 280 in the form of inverse control amplifiers. Thus the mean values of the components $K_c$ and $K_s$ of the complex output signal $K_c - jK_s$ from the comparator 231 are obtained via lowpass filters 251 and 252 respectively, and this complex signal is applied to the input of the calculating unit 237 for generating the control voltage $K_{c,\nu} - jK_{s,\nu}$ in the storage networks 262 and 263.

For the mean-value device 251, 252, 237 elimination of the quantity $Y_c + jY_s$ from the relations (I) and (II) gives the mathematical relationship:

$$(X_c + jX_s)(K_{c,\nu} - jK_{s,\nu})(K_c - jK_s) = Z_c + jZ_s \quad (IV)$$

where $(K_{c,\nu} - jK_{s,\nu})(K_c - jK_s)$ represents the complex voltage in the intermediate storage networks 266, 267 which at the switching instant of the electronic switches 264, 265 exactly supplies to storage networks 262, 263 the control voltage $K_{c,\nu+1} - jK_{s,\nu+1}$ which obtain for the next mean-value time interval $\nu + 1$.

Thus at the switching instant of the electronic switches 264, 265 we have for the complex voltages of the storage networks 262, 263 and of the intermediate storage networks 266, 267 the mathematical relationship:

$$K_{c,\nu+1} - jK_{s,\nu+1} = (K_{c,\nu} - jK_{s,\nu})(K_c - jK_s) \quad (V)$$

which, after some elaboration gives the components $K_{c,\nu+1}$ and $K_{s,\nu+1}$ in the complex output signal of the storage networks 262, 263:

$$\left. \begin{array}{l} K_{c,\nu+1} = K_{c,\nu} \cdot K_c - K_{s,\nu} \cdot K_s \\ \\ K_{s,\nu+1} = K_{c,\nu} \cdot K_s + K_{s,\nu} \cdot K_c \end{array} \right\} \quad (VI)$$

The two components $K_{c,\nu+1}$ and $K_{s,\nu+1}$ can simply be derived by means of the mean-value device 251, 252, 237 shown in detail in the Figure from its input signals $K_c$, $K_s$ and $K_{c,\nu}$, $K_{s,\nu}$ taken from lowpass filters 251, 252 and from feedback leads 253, 254 respectively.

For this purpose the calculating unit 237 of the mean-value device is provided with multipliers 281, 282, 283, 284 which are fed with the said input signals and which when connected in the manner shown to lowpass filters 251, 252 and feedback leads 253, 254, respectively, provide the products $K_{c,\nu} K_c$; $K_{s,\nu} K_s$; $K_{c,\nu} K_s$; $K_{s,\nu} K_c$, respectively. By means of combining devices which are connected to the outputs of the multipliers 281, 282; 283, 284 and are in the form of a subtraction circuit 285 and an addition circuit 286 respectively, via the electronic switches 268 and 269 which then are in the closed positions, the desired components $K_{c,\nu}$ $K_c - K_{s,\nu}$ $K_s$ and $K_{c,\nu}$ $K_s + K_{s,\nu}$ $K_c$ of the complex voltage are formed in the intermediate storage networks 266, 267 and are supplied at the rate of the mean-value period through the electronic switches 264 and 265 to the storage networks 262 and 263, respectively.

By means of the control voltage generator 230 high-quality adaptive equalization is obtained without the use of an additional periodic pulse pattern. For the sake of completeness it should be mentioned that the functions of the comparator 231 and the associated mean-value device 251, 252, 237 may be different, inter alia when different control characteristics for the phase and amplitude control circuits 173, 174 are used. If required, a comparator having a separate phase and amplitude comparison stage may be used by determining the amplitude and arguments of the signals $Y_c$, $Y_s$ and $Z_c$, $Z_s$ respectively. However, the control voltage generator 230 described is distinguished by its particularly clear structure and the excellent results it provides.

FIG. 5 shows a modified embodiment of the system of FIG. 3, elements corresponding to those of the preceding figures being denoted by like reference numerals.

The system shown in FIG. 5 is distinguished from that in FIG. 3 in that presetting is not effected by a direct-voltage setting source 258 but by means of a second control voltage generator 287 which by preset control and the use of a periodic pulse pattern achieves presetting of the equalizing system prior to the change-over to adaptive equalization control using the control voltage generator 230 and no periodic pulse pattern. For this purpose the two control voltage generators 287 and 230 are connected to the phase and amplitude control circuits 173 and 174 via a change-over arrangement 288 which under the control of change-over pulses applied through a lead 289 by the time distributor 29 effects changeover between the control voltage generators 287 and 230.

In this system preset equalization by means of a control voltage generator 287 is effected in a manner similar to that described for the system of FIG. 1 with reference to FIG. 2. More particularly, the control voltage generator 287 also includes a comparator 43 which is connected to the sub-bandpass filter and the additional sub-bandpass filter of the output channel 37 and also to the local phase and amplitude reference source 44 which includes the local test pulse pattern generator 48 of a structure equal to that of the test pulse pattern generator at the transmitter end, and the latter also effects synchronization of the test pulse pattern generator 48; the local test pulse pattern generator 48 supplies, for example, a periodic pulse train for the preset control under consideration. Synchronization of the test pulse pattern generator 48 advantageously is performed in the manner described in the main application by synchronizing the local test pulse pattern generator 48 with a frequency component at one-half clock frequency which is selected in the relevant output channel of the frequency analyzer 35 and is applied to the local test pulse pattern generator 48 through a synchronizing lead 181, ensuring a phase difference of $K\pi$, where $K = 0, 1, 2, 3, \ldots$ If thus in this system a periodic pulse pattern is transmitted for the preset equalization prior to the transmission of the information pulses, correct adjustment of the phase and amplitude control circuits 173 and 174 in the output channels 37 is effected in a feed-forward mode by means of the control voltage generator 287 and the change-over arrangement 288, while simultaneously the control voltage generator 230 for the adaptive equalization is given time to adjust to the correct control voltages on the control voltage leads 239, 240. When after the transmission of the periodic pulse pattern for preset equalization the information pulses are transmitted, the change-over arrangement 288 under the control of a change-over pulse applied through the lead 289 changes over to the control voltage generator 230 which already provides the correct control voltages on the control voltage leads 239, 240, after which adaptive equalization is ensured by the control voltage generator 230 without the use of a periodic pulse pattern.

The addition of the control voltage generator 287 for preset control to the control voltage generator 230 provides the important combination of advantages that while using adaptive equalization control and no additional adjusting pulse pattern, adaptive control is considerably accelerated and simultaneously the convergence range is given maximum extent.

What is claimed is:

1. System for equalizing the transfer characteristic of a transmission band associated with a transmission path and allotted to the transmission of information signals, which characteristic is constituted by an amplitude-frequency characteristic and a phase-frequency characteristic, which system is arranged for the transmission of information pulses, the system comprising:
    a. a first frequency analyzer connected to the transmission path for splitting up the transmission band into a first number of frequency sub-bands, the first frequency analyzer comprising a first delay circuit receiving said information signals from said transmission path and a plurality of parallel arranged output channels connected to said first delay circuit, each of the output channels incorporating a first sub-bandpass filter and a first additional sub-bandpass filter, said first sub-bandpass and first additional sub-bandpass filters having the same pass band but a constant mutual phase shift at least over the pass band of said filters, the first sub-bandpass and additional sub-bandpass filters being constituted by connecting each of the output channels through a first plurality of weighting networks to points of different time delay in the first delay circuit, while the first number of frequency sub-bands are derived from the parallel arranged output channels;
    b. the first and additional sub-bandpass filters in the output channels of the frequency analyzer jointly providing an uninterrupted pass region without rejectareas;
    c. a first output channel of the first frequency analyzer being provided with a phase control circuit and a second output channel of the frequency analyzer being provided with an amplitude control circuit, said phase and amplitude control circuits each controlled by a separate control voltage;
    d. a control voltage generator for generating the separate control voltages for controlling the phase and amplitude control circuits incorporated in the output channels of the first frequency analyzer, which control voltage generator comprises a plurality of comparators fed by frequency components of at least one spectrum component of an incoming adjusting signal which is split up into its frequency components in the first frequency analyzer, the generator further comprising a local reference source for the phase and amplitude reference of the adjusting signal split up into its frequency components, the control voltages for the different phase and amplitude control circuits being derived from the outputs of the comparators;

e. a system output circuit comprising a combination device connected to the phase and amplitude control circuits in the output channels and a succeeding pulse regenerator connected to an output of said combination device, the system for equalizing the transfer characteristic of a transmission band being characterized in that in the control voltage generator the local reference source is constituted by the pulse regenerator which by pulse regeneration of the information pulses provides the local reference signal, and in that the frequency components of the adjusting signal form the information signal which is derived by applying the outputs of the phase and amplitude control circuits to the combination device, bypassing the pulse regenerator, and for generating the control voltages for the phase and amplitude control circuits the different comparators in the control voltage generator have applied to them a second frequency sub-band and a second associated additional frequency sub-band of the adjusting signal, a first frequency selective means connected to said combining device including a second delay circuit for providing said second frequency sub-band and second associated additional frequency sub-band, a third frequency sub-band and a third associated additional frequency sub-band of the local reference signal being applied to the comparators in the control voltage generator, said third frequency sub-band and third associated additional frequency sub-band being in the same frequency range as said second frequency sub-band and second associated additional frequency sub-band, second frequency selective means connected to said combining device and including a third delay circuit having the same time delay as said second delay circuit for providing said third frequency sub-band and third associated additional frequency sub-band, said second frequency selective means being arranged as a second frequency analyzer having second frequency sub-bandpass filters and second associated additional frequency sub-bandpass filters by connecting a second plurality of weighting networks to points having a different time delay in the third delay circuit, the output circuits of the comparators each are connected to said phase and amplitude control circuits through mean-value devices for feedback control of the phase and amplitude control circuits in the equalizing system.

2. System as claimed in claim 1, wherein the first frequency selective means including the second delay circuit for the adjusting signal is arranged as a third frequency analyzer having third frequency sub-bandpass filters and associated third additional sub-bandpass filters by connecting a third plurality of weighting networks to points having a different time delay in the second delay circuit, which third frequency analyzer is connected to the combining device preceding the pulse regenerator.

3. System as claimed in claim 1 wherein the second and third sub-bandpass filters and the first, second and third associated additional sub-bandpass filters in the first, second and third frequency analyzers have the same amplitude-frequency characteristics but phase-frequency characteristics relatively shifted $\pi/2$ in phase.

4. System as claimed in claim 1, further comprising a presetting source connected to the phase and amplitude control circuits through an electronic switch, said electronic switch rendering said presetting source inoperative at the beginning of the information pulse transmission.

5. System as claimed in claim 4, in that the presetting source is a direct-voltage source.

6. System as claimed in claim 5, in which the first sub-bandpass filters in the output channels of the first frequency analyzer preceding the phase and amplitude control circuits have a substantially flat amplitude-frequency characteristics and a phase-frequency characteristic which is substantially proportional to the frequency, wherein said presetting source is connected in common to all the phase and amplitude control circuits of the first sub-bandpass filters in all the output channels of said first frequency analyzer, and wherein all the phase and amplitude control circuits of the additional sub-bandpass filters in all the output channels have been rendered inoperative simultaneously by said electronic switch.

7. System as claimed in claim 4, wherein the presetting source further comprises a second control voltage generator including a periodic adjusting pulse pattern generator, a plurality of comparators connected to the first sub-bandpass filters and the first additional sub-bandpass filters of the first frequency analyzer at inputs of the phase and amplitude control circuit and connected to said local adjusting pulse pattern generator, said local adjusting pulse pattern generator being synchronized by the incoming periodic adjusting pulse pattern provided by the input signal to said first frequency analyzer, said second control voltage generator being further provided with a change-over device for presetting the amplitude and phase control circuits with the second control voltage generator and subsequently changing over to feedback mode adaptive equalization control by means of the first control voltage generator.

8. System as claimed in claim 1, wherein the comparators in the control voltage generator are provided with parallel arranged multipliers controlled by the sub-bands and the associated additional sub-bands of the local reference signal and the adjusting signal, respectively, the parallel arranged multipliers being connected in pairs to further combining devices followed by dividers for generating the output signals from the comparator, said comparator output signals being components of the ratio between the local reference signal and the adjusting signal, written in complex notation.

9. System as claimed in claim 1, wherein the mean-value device comprises the cascade connection of low-pass filters connected to the output circuit of the comparator and a succeeding calculating unit.

10. System as claimed in claim 9, wherein the calculating unit of the mean-value device has an output circuit which comprises storage networks and electronic switches and is preceded by intermediate-storage networks also provided with electronic switches, the switches of the storage and intermediate-storage networks being controlled at the rate of the means value period by switching pulses, the output circuit of the calculating unit being connected through feedback leads to its input circuit, and further comprising lowpass filters connecting the output circuit of the comparator to a further input of said calculating unit.

11. System as claimed in claim 10, wherein the input circuit of the calculating unit of the mean-value device includes parallel arranged multipliers, means connecting inputs of said multipliers to the feedback leads and the lowpass filters in the output circuit of the comparator, the outputs of the multipliers being connected in pairs through combining devices to the intermediate storage networks, said intermediate storage networks being provided with electronic switches.

* * * * *

UNITED STATES PATENT AND TRADEMARK OFFICE
CERTIFICATE OF CORRECTION

PATENT NO. : 3,979,677
DATED : September 7, 1976
INVENTOR(S) : FELIX BAGDASARJANZ It is certified that error appears in the above-identified patent and that said Letters Patent are hereby corrected as shown below:

Col. 4, line 51, "ininterrupted" should be --uninterrupted--;

Col. 9, line 4, after "pulse" should be --regenerator 18 the equalized pulse pattern y(t) and the--;

line 20, after "respectively" insert -- , --(a comma);

line 54, cancel "$K_c - jK_s$:";

Claim 1, line 31, "rejectareas" should be --reject-areas--;

Claim 5, line 1, "in that" should be --wherein--;

Signed and Sealed this

Twenty-third Day of November 1976

[SEAL]

Attest:

RUTH C. MASON
*Attesting Officer*

C. MARSHALL DANN
*Commissioner of Patents and Trademarks*